3,468,779
ELECTROCOATING PROCESS

William W. Slater and Lawrence E. Thow, Louisville, Ky., assignors to Celanese Coatings Company, New York, N.Y., a corporation of Delaware
No Drawing. Filed Mar. 19, 1965, Ser. No. 441,365
Int. Cl. C23b 13/00; B01k 5/02
U.S. Cl. 204—181                                        2 Claims

ABSTRACT OF THE DISCLOSURE

A process for electrocoating an aqueous dispersion of a coating-forming resin ester and a salted amine, said salted amine being the reaction product of a carboxylic acid having 1 to 8 carbon atoms and a tertiary amine in which the fatty carbon chain has from 12 to 24 carbon atoms.

---

This invention relates to aqueous coating compositions and more particularly to dispersions or emulsions of resin esters, especially epoxy resin esters, suitable for coatings. The invention includes amine salts which act as cationic emulsifying or dispersing agents in aqueous coating compositions containing the epoxy resin esters. Coating compositions according to the present invention are suitable for electro-phoretic coating and the invention includes processes for electro-phoretic coating.

Depending upon the exact nature of the epoxy resin ester and the amine salt and the like the epoxy resin ester will be either dispersed or emulsified. For the sake of convenience dispersions and emulsions will be referred to generically as "dispersions" except in the examples wherein the term dispersion will be used specifically rather than generically. Similarly, the term "dispersing agent" will be used to indicate generically dispersing and emulsifying agents. The dispersing agents of the present invention are carboxylic acid salts of tertiary amines. For the sake of convenience these salts will generally be referred to hereafter simply as "amine salts."

Amine salts according to the present invention are chosen on the basis of being decomposable by electrolysis and good dispersing agents for epoxy resin esters. To achieve this, the tertiary amines which are selected for the practice of the present invention are fatty tertiary amines in which the fatty carbon chain has from 12 to 24 carbon atoms and preferably from 16 to 20.

The carboxylic acid with which the tertiary amine is salted is preferably formic acid, acrylic acid, acetic acid, or propionic acid. These lower molecular weight acids are preferred because during electrolysis of the dispersion they can decompose as gases which can pass into the atmosphere and thereby not contribute to by-product accumulation in the bath. However, carboxylic acids having an aliphatic portion attached to the carboxyl group of 3 to 8 carbon atoms may also be used; as the dispersion is electrolized the carboxylic groups can decompose into carbon dioxide and water and the aliphatic portion can remain as an oil in the bath which can readily be removed by such means as decantation if desired. Formic acid and acetic acid, particularly the former, are especially preferred because tertiary amine salts thereof most effectively disperse epoxy esters and these acids most readily decompose as gases only.

The epoxy resins, the esters of which are dispersed and coated according to the present invention, are glycidyl polyethers which are well known and therefore need not be discussed at length herein. The most useful of these epoxide resins is made from the reaction of a polyhydric phenol with epihalohydrin or glycerol dihalohydrin and a sufficient amount of a caustic alkali to combine with the halogen of the halohydrin. Products resulting from the reaction of a polyhydric phenol with epichlorhydrin or glycerol dichlorhydrin are monomeric or straight chain polymeric products characterized by the presence of more than one epoxide group, i.e., a 1,2-epoxy equivalency greater than one. Dihydric phenols that can be used for this purpose include bisphenol, resorcinol, catechol, hydroquinone, methyl resorcinol, 2,2-bis (4-hydroxyphenyl) butane, 4,4'-dihydroxybenzophenone, bis (4-hydroxyphenyl) ethane, and 1,5 - dihydroxy naphthalene. The preparation of polyepoxides from polyhydric phenols and epihalohydrin is described in U.S. Patents 2,467,171, 2,538,072, 2,582,985, 2,615,-007 and 2,698,315, the proportion of halohydrin to dihydric phenol being at least about 1.2 to 1 up to about 10 to 1.

Higher melting point resins are made from the reaction of such resins with a further amount of dihydric phenol less than that equivalent to the epoxide content of the resin, as set forth in U.S. Patent 2,615,008. Halohydrins can be further exemplified by 2-chloro-1,2-epoxy butane, 3-bromo-1,2-epoxy hexane, 2-chloro-1,2-epoxy octane and the like. Another group of glycidyl polyethers is produced by the reaction of a polyhydric alcohol with epichlorhydrin or glycerol dichlorohydrin as disclosed in Zech Patent U.S. 2,581,464. Still other groups of glycidyl polyethers are those which are modified with cyanurate functional groups as disclosed in U.S. Patents 2,809,942, 2,864,805, 2,893,978, 2,971,942, 2,947,725, 2,947,726, and 2,940,953, and those modified with organo-silicon compounds as disclosed in U.S. Patents 3,003,992, 3,150,-116, 3,154,597.

The epoxy resin esters which are used in the present invention are conventional and therefore need not be described herein in detail. Typical epoxy resin esters are formed from unsaturated oil acids such as fatty acids as described in U.S. Patent 2,502,518 and from oil acids low in unsaturation such as tall oils as described in U.S. Patent 2,493,486. These may be employed in connection with selected amounts of saturated oil acids and/or with polybasic acids and anhydrides and high molecular weight monobasic acids are disclosed in U.S. Patent 2,504,518. Additionally, modified condensates of phenols and fatty acids may be employed as may rosins.

The conventional epoxy resin esters which are used in the present invention are essentially free of epoxy functionality. This is so because the dispersed epoxy resin esters in the present invention are exposed to amino groups and epoxy functionality in the resin ester would result in gelling by means of conventional amine catalyzed curing.

Various pigments can be used and added to the dispersions according to the present invention as will be apparent to those skilled in the art. When the dispersions are to be used as a primer it is advantageous to incorporate therein such pigments as cadmium sulfide, cadmium selenide and magnesium silicate, as well as silica, chromic oxide, clay, talc, barytes, carbon black, titanium oxide, and so forth.

In general dispersions according to the present invention suitable for coating processes are made by intermixing the epoxy resin ester, pigment if desired, the amine, the carboxylic acid and water. Of course, if desired, the amine can be salted with the carboxylic acid separately and the salted amine intermixed with the other components.

It is found particularly convenient to intermix some of the amine with the pigment during the grinding of the pigment, for example in a pebble mill, in the presence of a conventional grinding vehicle such as water or xylol or other conventional grinding vehicle; and in a separate operation to intermix under high shear the epoxy resin ester, the pigment paste from the grinding mill, more of the amine, carboxylic acid and water thereby to form the final dispersion; generally the additional water added in the second operation is of such quantity that the dispersion inverts from water-in-oil to oil-in-water. Similarly, using, for example, a roller mill or a Baker-Perkins paint grinding mill. the epoxy resin ester may be made into a paste with the pigment in the mill, in the presence of a conventional grinding vehicle, and in a second operation the paste from the mill is intermixed under high shear with the amine, the acid and water in order to obtain the final dispersion; again, generally water is added in such quantity that the dispersion inverts from water-in-oil to oil-in-water. These formulation techniques are merely exemplary and others will be obvious to those skilled in the art.

In making the dispersions of the present invention the amount of amine used is preferably about 5 to 15% based on the weight of the epoxy resin ester and the amount of carboxylic acid used is about ½ to 1½ equivalents of acid per equivalent of amine. When pigment is used the ratio of pigment to binder (i.e. epoxy resin ester) may be up to about 1:1, of course the maximum proportion of pigment usable will depend upon the nature of the particular pigment being considered and these proportions can routinely be determined by those skilled in the art; thus, for example, when pigments of relatively light covering power such as barytes are used the ratio of pigment to binder may be up to about 1:1 while on the other hand, for carbon black, which is very high in covering power, it would be wasteful to employ a pigment to binder ratio higher than about 1:20.

While coatings made from the dispersions of the present invention will air-dry or bake without the addition of curing agents or modifiers, urea resins, phenolic resins, melamine resins, polyamids, polysulfides, polyamines, benzoguanamine resins, acids and other conventional curing agents or modifiers may be incorporated in the dispersions to obtain a harder or quicker cure. When a resinous modifying or curing agent is used such as a melamine resin or a benzoguanamine resin it is sometimes found advantageous to elevate the temperature of the resin to be added and/or of the dispersion to aid in the dispersion of the resin in the dispersion to which it is being added.

In order to obtain dispersions of good stability yet avoid the cost and inconvenience of handling excess water the dispersions of the present invention may initially be made of a concentration of about 45 to 65% by weight non-volatile solids (i.e. epoxy resin ester, pigment, and undissolved curing agent or modifier if any). For the purpose of coating the dispersions are diluted with water to concentrations in the range of about 3 to 25% by weight non-volatile solids. Generally, the dispersions of the present invention in concentrations suitable for coating are acidic; thus, for example, when formic acid is used the pH of the dispersion will generally be from about 3.5 to 5; in general for all the coating dispersions of the present invention the pH will be between about 3 and 7. Coatings can be prepared from the coating dispersions of the present invention by using conventional techniques such as spraying, roller coating, brushing, dip coating, etc.

The coating dispersions of the present invention are especially useful in electro-coating or electro-phoretic processes. The article to be coated having a conductive surface is made the cathode; the container holding the dispersion may be made the anode or a separate anode may be provided in the container. The establishment of an electrical potential between the cathode and the anode causes the resin to plate out on the cathode as a coating.

It is hopothesized that the mechanism of the electro-coating is as follows:

When an electrical potential is applied to the dispersion, the amine ions, $$R_2 - \overset{R_3}{\underset{R_1}{\overset{|}{N}}} H^+$$

of the salted tertiary amine, which are proton carriers, migrate toward the cathode, carrying the resin with any pigments, modifying and curing agents, where the following reaction takes place:

$$R_2 - \overset{R_3}{\underset{R_1}{\overset{|}{N}}} H^+ + 1e \longrightarrow R_2 - \overset{R_3}{\underset{R_1}{\overset{|}{N}}} + H°$$

while at the anode the following reaction with the carboxylate ions, $$R - C \overset{O}{\underset{O^-}{\diagdown}}$$

which carrying a negative charge migrate toward the anode, takes place:

$$R - C \overset{O}{\underset{O^-}{\diagdown}} \longrightarrow R° + CO_2 + 1e$$

Overall, the epoxy resin ester with pigments, modifying and curing agents, if any, and the amine component which is insolubilized, are electro-deposited at the cathode while the carboxylic acid, if formic acid, is decomposed at the anode into carbon dioxide and hydrogen gas which pass into the atmosphere, if acetic acid, into carbon dioxide and ethane which pass into the atmosphere, and, similarly, if acrylic acid into carbon dioxide and butadiene, if propionic acid, into carbon dioxide and butane, and so forth. The acids are selected on the basis that when used to salt the amine the salted amine will be substantially water soluble and ionizable.

The coatings of the present invention can be air-dried at ambient temperatures or they can be cured by heat (i.e., baked). Excellent films have been obtained by heating the coatings between about 300 to 400° F. for between 15 and 45 minutes. Driers (i.e., drying agents) can be used to obtain cures of the coatings but they are not necessary in most instances.

Coatings or films prepared from the dispersions of the present invention have excellent flexibility and adhesion as well as good salt spray resistance and resistance to boiling water. One of the main areas of utility for the coatings of the present invention is as a primer paint for automobiles and appliances. The coatings, however, can also be used to form decorative or protective top coatings.

The invention will now be further illustrated by reference to the following examples. The term "throwing power" as used herein is defined as the ability of an electro-phoretic coating composition to cover electrode areas that are either shielded or not directly facing the oppositely charged electrode. This ability to coat the recessed areas varies with the degree of shielding. If the degree of shielding is held constant the throwing power is defined on a percentage basis, that is:

$$\text{Percent throw} = \frac{\text{Total shielded area coated}}{\text{Total shielded area}} \times 100$$

In other words, for example, a throwing power of 70% means that a cathode is completely coated on its unshielded sides facing the anode while the opposite or shielded sides are only 70% coated, the remaining 30% of the cathode being substantially bare metal. The term "current density" is defined herein as the current in amperes per square inch required to deposit or plate the film on the cathode; this figure is determined by dividing the current in amperes by the area in square inches of the surface of the cathode; the first figure in the column under current density in the examples is the current (amperes per square inch of cathode surface) that flows initially, i.e., as soon as the electric potential is applied to the dispersion (electro-phoretic bath), and the second figure is the current flow after one minute; the current when the applied voltage is held constant decreases during the electro-phoretic process due to the build-up of the insulating coating on the cathode.

The invention will now be further illustrated by reference to the following examples, wherein proportions are given by weight unless otherwise stated.

Example I

A mill paste (i.e., paste product of the mill) is made by intermixing the following on a five roller mill:

|  | Percent |
|---|---|
| Carbon black | 2.9 |
| Clay | 18.7 |
| Epoxy-resin ester | 69.0 |
| Xylol | 9.4 |
|  | 100.0 |

The epoxy resin ester is the product of the esterfication of 51.8% by weight "Epoxy Resin X" with 41.2% by weight soya fatty acids and 7.0% by weight dimer fatty acids (such as the dimer acid described at pages 276, 277 of vol. I of "Organic Coating Technology" by Payne, published by John Wiley & Sons in 1954); "Epoxy Resin X" is an epoxide resin which is the reaction product of 1.22 mols of epichlorohydrin per mol of bisphenol A in the presence of caustic and has a melting point of 95–105° C., an epoxide equivalent weight of 870–1025, an hydroxyl equivalent weight of 175 and a weight average molecular weight of 1350.

This mill paste is then emulsified with water and with dimethyl soya amine and formic acid as the emulsifying agent, in a vessel equipped with a high speed, high shear stirrer. The proportions used are as follows:

|  | Percent |
|---|---|
| Mill paste | 61.0 |
| Dimethyl soya amine (DMS) | 3.6 |
| Formic acid (88% by weight acid in 12% water) | .8 |
| Distilled water | 34.6 |
|  | 100.0 |

To accomplish the emulsification, the DMS and mill paste are mixed together first for about 5 minutes and then the formic acid is added and mixed about 3 minutes. The distilled water finally is added slowly until emulsification is effected. The pH of the emulsion is 4.0. When the emulsion is reduced to 10% non-volatile solids for electro-deposition the pH rises to 4.2. This 10% non-volatile solids emulsion is placed in an electrolytic cell and used as a coating bath. A cold-rolled steel panel (4" x 5") coated with zinc phosphate is used as the cathode of the cell and a positive charge is applied to another electrode also immersed in the bath. A potential difference between the other electrode and the steel panel is maintained at 250 volts for one minute and an epoxy resin ester film of 1.0–1.1 mils thickness is plated out on the steel cathode panel. The current for 40 square inches of anode area is 0.6–0.15 amp, the higher figure being the current at the begining of the operation and the lower figure being the current at the end of the operation.

Example II

A mill paste is made by intermixing the following on a Baker-Perkins pain grinding mill:

|  | Percent |
|---|---|
| Cadmium lithopone | 30.6 |
| Epoxy-resin ester (same as in Example I) | 61.2 |
| Xylol | 8.2 |
|  | 100.0 |

The mill paste is then emulsified with water and with 1 - hydroxymethyl - 2 - heptadecenyl imidazoline (Amine 220) and formic acid as the emulsifying agent. The proportions used are as follows:

|  | Percent |
|---|---|
| Mill paste | 53.2 |
| 1-hydroxyethyl-s-heptadecenyl imidazoline (Amine 220) | 1.2 |
| Formic acid (88% by weight acid in 12% water) | 0.9 |
| Deionized water | 44.7 |
|  | 100.0 |

The Amine 220 and mill paste are mixed together first for about 10 minutes and then the formic acid is added and mixed about 10 minutes. The deionized water finally is added slowly until emulsification is effected. The pH of the emulsion is 3.4. When the emulsion is reduced to 10% non-volatile solids for electro-deposition the pH rises to 3.7. This reduced emulsion is tested on a coil coater which is an apparatus that simulates the effect on the bath of continuous electro-coating. One turnover with this apparatus is equivalent to removing all of the solids of the bath. During continuous coating, as the solids are being removed more solids are added; when an amount of solids equal to what the bath originally contained has been added, one "turnover" has occurred. Using the coil coater test, it is found that the emulsion will serve as a stable, long-life elecro-coating bath.

Example III

A mill paste is made by intermixing the following in a pebble mill; grinding it for 20 hours followed by draining:

|  | Percent |
|---|---|
| Carbon black | 6.0 |
| Dimethyl hydrogenated tallow amine (Armeen DMHTD) | 0.7 |
| Distilled water | 93.3 |
|  | 100.0 |

The mill paste is then mixed with epoxy resin ester and this mixture is emulsified with water with DMHTD and formic acid as the emulsifying agent in a vessel equipped with a high speed, high shear stirrer. The proportions used are as follows:

|  | Percent |
|---|---|
| Epoxy-resin ester (same as in Example I) | 58.9 |
| Pebble mill paste | 30.9 |
| Dimethyl hydrogenated tallow amine | 5.6 |
| Formic acid (88% by weight acid in 12% water) | 0.6 |
| Distilled water | 93.3 |
|  | 100.0 |

The epoxy resin ester and the pebble mill paste are mixed together for 20 minutes. The dimethyl hydrogenated tallow amine is then mixed in for an additional 20 minutes. The formic acid is then mixed in for another 10 minutes and the distilled water is finally mixed in for 15 minutes to effect emulsification. The pH of the emulsion is 3.8. The emulsion is then reduced to 10% non-volatile solids for electro-deposition; the pH rises to 4.1. The emulsion is tested on the coil coater. It is found that, at 85° F., using a potential of 200 volts, the current is initially 2.0 amps and after 15 turnovers the current is 2.7 amps. Accordingly, it is seen that the emulsion will serve as a stable, long-life electro-coating bath.

While the invention has been particularly described with respect to epoxy resin esters as the coating-forming resin esters, other resin esters may be used. Thus, for example, the invention has been found useful with esterified styrene-allyl alcohol copolymers which are malenized with maleic anhydride.

The invention is not limited to the specific embodiments described herein, but it is intended that departures therefrom within the spirit of the invention be within the scope of the appended claims.

The embodiments of the invention in which an exclusive property or privilege is claimed are defined as follows:

1. A process for coating an electrically conductive metallic surface with a coating-forming resin ester comprising using an aqueous dispersion of a coating-forming epoxy resin ester, consisting of a coating-forming epoxy resin ester, water and a salted amine, said salted amine being the reaction product of a carboxylic acid having 1 to 8 carbon atoms and a tertiary amine in which the fatty carbon chain has from 12 to 24 carbon atoms, as the bath in an electrolytic cell comprising an anode and a cathode wherein at least part of the surface of said cathode comprises the surface to be coated, connecting said anode and said cathode to a source of electromotive potential, applying said potential across said anode and said cathode thereby to electro-deposit said coating-forming resin ester on said cathode surface as a coating.

2. A coated electrically conductive metallic surface made by the process of claim 1.

References Cited

UNITED STATES PATENTS

| | | | |
|---|---|---|---|
| 3,355,401 | 11/1967 | Tanner | 260—29.2 X |
| 3,366,563 | 1/1968 | Hart et al. | 204—181 |
| 3,413,322 | 11/1968 | Vasta | 204—59 X |
| 2,206,090 | 7/1940 | Haggenmacher | 204—181 |
| 2,530,366 | 11/1950 | Gray | 204—181 |
| 3,230,162 | 1/1966 | Gilchrist | 204—181 |

HOWARD S. WILLIAMS, Primary Examiner

U.S. Cl. X.R.

260—29.2